(12) United States Patent
Ray et al.

(10) Patent No.: US 11,816,479 B2
(45) Date of Patent: Nov. 14, 2023

(54) SYSTEM AND METHOD FOR IMPLEMENTING A CODE AUDIT TOOL

(71) Applicant: JPMorgan Chase Bank, N.A., New York, NY (US)

(72) Inventors: Rajat Ray, Singapore (SG); Navnidh Bhalla, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/340,436

(22) Filed: Jun. 7, 2021

(65) Prior Publication Data
US 2021/0406004 A1    Dec. 30, 2021

Related U.S. Application Data

(60) Provisional application No. 63/043,949, filed on Jun. 25, 2020.

(51) Int. Cl.
*G06F 8/77*    (2018.01)
*G06F 8/75*    (2018.01)

(52) U.S. Cl.
CPC .......... *G06F 8/77* (2013.01); *G06F 8/751* (2013.01)

(58) Field of Classification Search
None
See application file for complete search history.

(56) References Cited

U.S. PATENT DOCUMENTS

| | | | |
|---|---|---|---|
| 8,473,907 B1* | 6/2013 | Zandi | G06F 11/3616 |
| | | | 714/38.1 |
| 8,627,287 B2* | 1/2014 | Fanning | G06F 8/75 |
| | | | 717/124 |
| 9,110,770 B1* | 8/2015 | Raju | G06F 8/10 |
| 9,268,672 B1* | 2/2016 | Gupta | G06F 11/3684 |
| 9,274,924 B2* | 3/2016 | Hentschel | G06F 8/70 |
| 10,423,709 B1* | 9/2019 | Bradley | G06F 16/9577 |
| 10,579,803 B1* | 3/2020 | Mueller | G06F 21/577 |
| 10,949,333 B1* | 3/2021 | Malde | G06F 8/71 |
| 11,042,369 B1* | 6/2021 | Kimball | G06F 11/3466 |

(Continued)

OTHER PUBLICATIONS

T. Cerny et al., "On Code Analysis Opportunities and Challenges for Enterprise Systems and Microservices," in IEEE Access, vol. 8, pp. 159449-159470, 2020, doi: 10.1109/ACCESS.2020.3019985. (Year: 2020).*

(Continued)

*Primary Examiner* — Andrew M. Lyons
(74) *Attorney, Agent, or Firm* — GREENBLUM & BERNSTEIN, P.L.C.

(57) ABSTRACT

An embodiment of the present invention is directed to a code audit tool that intelligently analyzes and profiles code, such as Python code, based on a variety of previously unmeasured factors and metrics including a set of software dimensions, such as Algorithmic Complexities; Software Sizing Metrics; Anti-Pattern Implementations; Maintainability Metrics; Dependency Mappings; Runtime Metrics; Testing Metrics; and Security Metrics. Once this analysis is complete, a standardized report card or other scoring interface may be generated. This may include analytical findings as well as suggestions and recommend steps so that developers can make informed decisions, enhance their code bases and improve the score assigned to their code.

16 Claims, 12 Drawing Sheets

(56) References Cited

U.S. PATENT DOCUMENTS

| | | | | |
|---|---|---|---|---|
| 11,175,897 | B1* | 11/2021 | Deng | G06F 8/433 |
| 11,392,844 | B1* | 7/2022 | Rao | G06N 20/00 |
| 2003/0070157 | A1* | 4/2003 | Adams | G06F 8/77 |
| | | | | 714/E11.22 |
| 2005/0223354 | A1* | 10/2005 | Drissi | G06F 8/36 |
| | | | | 717/114 |
| 2010/0162215 | A1* | 6/2010 | Purcell | G06F 8/77 |
| | | | | 717/127 |
| 2011/0022551 | A1* | 1/2011 | Dixon | G06F 11/3616 |
| | | | | 706/12 |
| 2014/0123110 | A1* | 5/2014 | Wan | G06F 11/3672 |
| | | | | 717/124 |
| 2014/0157239 | A1* | 6/2014 | Goetsch | G06F 11/3604 |
| | | | | 717/126 |
| 2016/0124724 | A1* | 5/2016 | Gautam | G06F 11/3616 |
| | | | | 717/143 |
| 2016/0239402 | A1* | 8/2016 | Zieder | G06F 8/20 |
| 2017/0034023 | A1* | 2/2017 | Nickolov | H04L 43/0817 |
| 2017/0075790 | A1* | 3/2017 | Macleod | G06F 11/3664 |
| 2017/0235569 | A1* | 8/2017 | Sturtevant | G06Q 10/06393 |
| | | | | 717/102 |
| 2018/0275989 | A1* | 9/2018 | Kakkad | G06F 11/3409 |
| 2018/0374024 | A1* | 12/2018 | Cai | G06Q 10/0633 |
| 2019/0129701 | A1* | 5/2019 | Hawrylo | G06F 8/60 |
| 2019/0272171 | A1* | 9/2019 | Chen | G06F 8/75 |
| 2019/0294525 | A1* | 9/2019 | Scheiner | G06F 11/3608 |
| 2019/0310974 | A1* | 10/2019 | Pishe | G06F 16/2255 |
| 2019/0317885 | A1* | 10/2019 | Heinecke | G06F 11/3616 |
| 2019/0332524 | A1* | 10/2019 | Jayaswal | G06F 11/3692 |
| 2020/0159525 | A1* | 5/2020 | Bhalla | G06F 21/563 |
| 2020/0160458 | A1* | 5/2020 | Bodin | G06F 8/33 |
| 2020/0218533 | A1* | 7/2020 | Sharma | G06F 8/77 |
| 2021/0035116 | A1* | 2/2021 | Berrington | G06F 9/54 |
| 2021/0049003 | A1* | 2/2021 | Trahan | G06F 8/658 |

OTHER PUBLICATIONS

E. A. Nichols and G. Peterson, "A Metrics Framework to Drive Application Security Improvement," in IEEE Security & Privacy, vol. 5, No. 2, pp. 88-91, Mar.-Apr. 2007, doi: 10.1109/MSP.2007.26. (Year: 2007).*

M. Rodriguez, M. Piattini and C. Ebert, "Software Verification and Validation Technologies and Tools," in IEEE Software, vol. 36, No. 2, pp. 13-24, Mar.-Apr. 2019, doi: 10.1109/MS.2018.2883354. (Year: 2019).*

J. -L. Letouzey, "The SQALE method for evaluating Technical Debt," 2012 Third International Workshop on Managing Technical Debt (MTD), Zurich, Switzerland, 2012, pp. 31-36, doi: 10.1109/MTD.2012.6225997. (Year: 2012).*

X. Lingzi and L. Zhi, "An Overview of Source Code Audit," 2015 International Conference on Industrial Informatics—Computing Technology, Intelligent Technology, Industrial Information Integration, Wuhan, China, 2015, pp. 26-29, doi: 10.1109/ICIICII.2015.94. (Year: 2015).*

* cited by examiner

Figure 6

| Python Test File | Line Complexity | Overall Complexity |
|---|---|---|
| A = [[12,7,3],[4,5,6],[7,8,9]] | O(1) -> Assignment operator | O(1) |
| B = [[5,8,1],[6,7,3],[4,5,9]] | O(1) -> Assignment operator | O(1) |
| result = [[0,0,0][0,0,0],[0,0,0]] | O(1) -> Assignment operator | O(1) |
| for i in range(len(A)): | O(n) -> Matrix of size n | O(n*n*n) |
|    for j in range(len(B[0])): | O(n) -> Matrix of size n | |
|      for k in range(len(B)): | O(n) -> Matrix of size n | |
|         result[i][j] += A[i][k] * B[k][j] | O(1) -> Math equation is constant | O(1) |
| Overall Complexity | | $O(n^3)$ |

Figure 7

| Python Test File | Halstead Metrics |
|---|---|
| n = 23<br>fact = 1<br><br>for i in range (1,n+1) :<br>  fact = fact * i<br><br>print ("The factorial of 23 is : ",end="")<br>print (fact) | • Number of distinct operators – 2<br>• Number of distinct operands – 4<br>• Program length – 6<br>• Volume – 15.509<br>• Difficulty – 1.0 |
| | Raw Metrics<br><br>• Source Lines of Code – 6<br>• Lines of Code – 8<br>• Logical Lines of Code – 6<br>• Blank – 2 |

Figure 8

Anti-Pattern (Using single character variable names)

```
a = 10
b = 5
c = d (a,b)

def  d (a,b) :
     r = False
     if a % b == 0:
         r = True
     return r
```

Desired Pattern (identify the pattern and suggest remediation steps)

```
dividend = 10
divisor = 5
is_factor = divisibility_check (dividend,divisor)

def divisibility_check (dividend,divisor:
     result = False
     if dividend % divisor == 0:
         result = True
     return result
```

Figure 9

```
*********************Begin Execution*********************
Python Version: 2.7 (WARNING: Python 2.X is no longer supported.  Please upgrade ASAP)
Script Load Time:  0.7s (OKAY)
Script Execution Time : 1.4s (OKAY)
*********************Execution Complete*********************
```

Figure 10

| Element | Statistics, % |
|---|---|
| 📁 idea | |
| 📁 api | 14% files, 77% lines covered |
| 📁 config | |
| 📁 cookies | |
| 📁 instanclient_12... | |
| 📁 lib | 100% files, 78% lines covered |
| 📁 pki | |
| 📁 services | |
| 📁 tests | 100% files, 95% lines covered |
| 📄 gitignore | |
| 📄 Jenkinsfile | |
| 📄 jules.yml | |
| 📄 manifest.yaml | |
| 📄 Readme.md | |
| 📄 requirements.txt | |
| 📄 runtime.txt | |

Figure 11

| | |
|---|---|
| File.py | import requests<br>url – "https://my_example_data_source.com"<br><br>def get_data_from_source():<br>    username = "my_username"<br>    password = "my_password"<br>    data = requests.get(url, auth=(username,password)) |
| Output | Filename: File.py<br>Line number: 6<br>Severity: "MEDIUM"<br>Description: Possible hardcoded password 'my_password'.<br>More Info: The use of hard-coded passwords increases the possibility of password guessing tremendously. Please encode/encrypt your password or use a password vault. |

Figure 12

SYSTEM AND METHOD FOR IMPLEMENTING A CODE AUDIT TOOL

CROSS REFERENCE TO RELATED APPLICATIONS

The application claims priority to U.S. Provisional Application 63/043,949, filed Jun. 25, 2020, the contents of which are incorporated by reference herein in their entirety.

FIELD OF THE INVENTION

The invention relates generally to a system and method for implementing a code audit tool, specifically a Python Performance Profiling Tool.

BACKGROUND OF THE INVENTION

Developers are expected to adopt the best coding practices while building applications and services. Although there are utilities in Integrated Development Environments (IDE) and Version Control Systems (VCS), there is a significant gap when it comes to holistically profiling code, such as Python code. For example, IDEs primarily help with linting, code coverage, resource usage, basic code profiling, debugging and runtime errors. VCSs assist with change tracking, code sharing, code management, code accountability and pre-commit hooks. While helpful, these current utilities do not offer in-depth insights needed to make code (such as Python code) efficient, optimal, secure and maintainable.

If the underlying code does not embody certain properties from the start, unnecessary time and money are required to fix, maintain, upgrade and run the code in the future. Moreover, poor code negatively impacts execution speeds which can be crippling in use cases such as high-frequency algorithmic trading where code performance is imperative. Other consequences of poor code include security risks such as denial-of-service attacks, which cause user inconvenience through network and processing delays. In addition, such risks lead to increased operating costs because more compute power is needed to run inefficient code. Taking a long term view, this problem will become more pronounced as Python continues to gain traction and developers increasingly start reusing potentially faulty building blocks of existing Python code.

Current tools are unsatisfactory because they are required to be retrofitted to accommodate Python instead of being built for Python. This leads to inefficiencies as well as inaccurate assessments and reporting.

These and other drawbacks exist.

SUMMARY OF THE INVENTION

According to an embodiment, the invention relates to a system that implements a code audit tool, such as a Python Performance Profiling Tool. The system comprises: an interactive user interface that interacts with one or more users through a communication network; a memory component that stores industry standard for software development; and a computer processor, coupled to the interactive user interface and the memory component and is programmed to perform the steps of: identifying, via an electronic input, a file that comprises a set of code; retrieving, from the file, the set of code; analyzing the set of code by invoking an optimal series of processes comprising: an Algorithmic Complexities process; a Software Sizing Metrics process; an Anti-Pattern Implementations process; a Maintainability Metrics process; a Dependency Mappings process; a Runtime Metrics process; a Testing Metrics process; and a Security Metrics; generating a code health determination based on the optimal series of processes prior to deployment of the set of code; generating, via the interactive user interface, a standardized output based on the optimal series of processes, the standardized output further comprising one or more code suggestions and recommended changes; and receiving at least one input responsive to the one or more code suggestions and recommended changes to improve the code health determination.

According to another embodiment, the invention relates to a method that implements a code audit tool, such as a Python Performance Profiling Tool. The method comprises the steps of: identifying, via an electronic input, a file that comprises a set of code; retrieving, from the file, the set of code; analyzing, via an analysis engine comprising a computer processor, the set of code by invoking an optimal series of processes comprising: an Algorithmic Complexities process; a Software Sizing Metrics process; an Anti-Pattern Implementations process; a Maintainability Metrics process; a Dependency Mappings process; a Runtime Metrics process; a Testing Metrics process; and a Security Metrics; generating a code health determination based on the optimal series of processes prior to deployment of the set of code; generating, via an interactive user interface, a standardized output based on the optimal series of processes, the standardized output further comprising one or more code suggestions and recommended changes; and receiving at least one input responsive to the one or more code suggestions and recommended changes to improve the code health determination.

An embodiment of the present invention is directed to a specially programmed computer system comprising one or more computer processors, interactive interfaces, electronic storage devices, and networks. The computer implemented system and method described herein provide unique advantages to developers, managers and other users, according to various embodiments of the invention. An embodiment of the present invention is directed to a code audit tool that enables developers to generate and distribute high quality code, such as Python code, that is efficient, optimal, secure and maintainable. An embodiment of the present invention further addresses existing gaps and holistically profiles code through code audits. The code audit tool provides actionable, in-depth insights to developers, regardless of expertise and experience. Accordingly, the resulting code is more efficient, optimal, secure and maintainable and further translates to significant efficiencies in time and resources.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

FIG. 6 is an exemplary user interface, according to an embodiment of the present invention.

FIG. 7 is an example of operational complexities associated with Matrix Multiplication in Python, according to an embodiment of the present invention.

FIG. 8 an example of software sizing metrics, according to an embodiment of the present invention.

FIG. 9 illustrates an example relating to readability/maintainability Anti-Pattern, according to an embodiment of the present invention.

FIG. 10 an example of runtime metrics that may be displayed at a module-level, according to an embodiment of the present invention.

FIG. 11 is an exemplary illustration of testing metrics, according to an embodiment of the present invention.

FIG. 12 is an example using hardcoded passwords, according to an embodiment of the present invention.

DETAILED DESCRIPTION OF THE PREFERRED EMBODIMENT(S)

Figure 1:
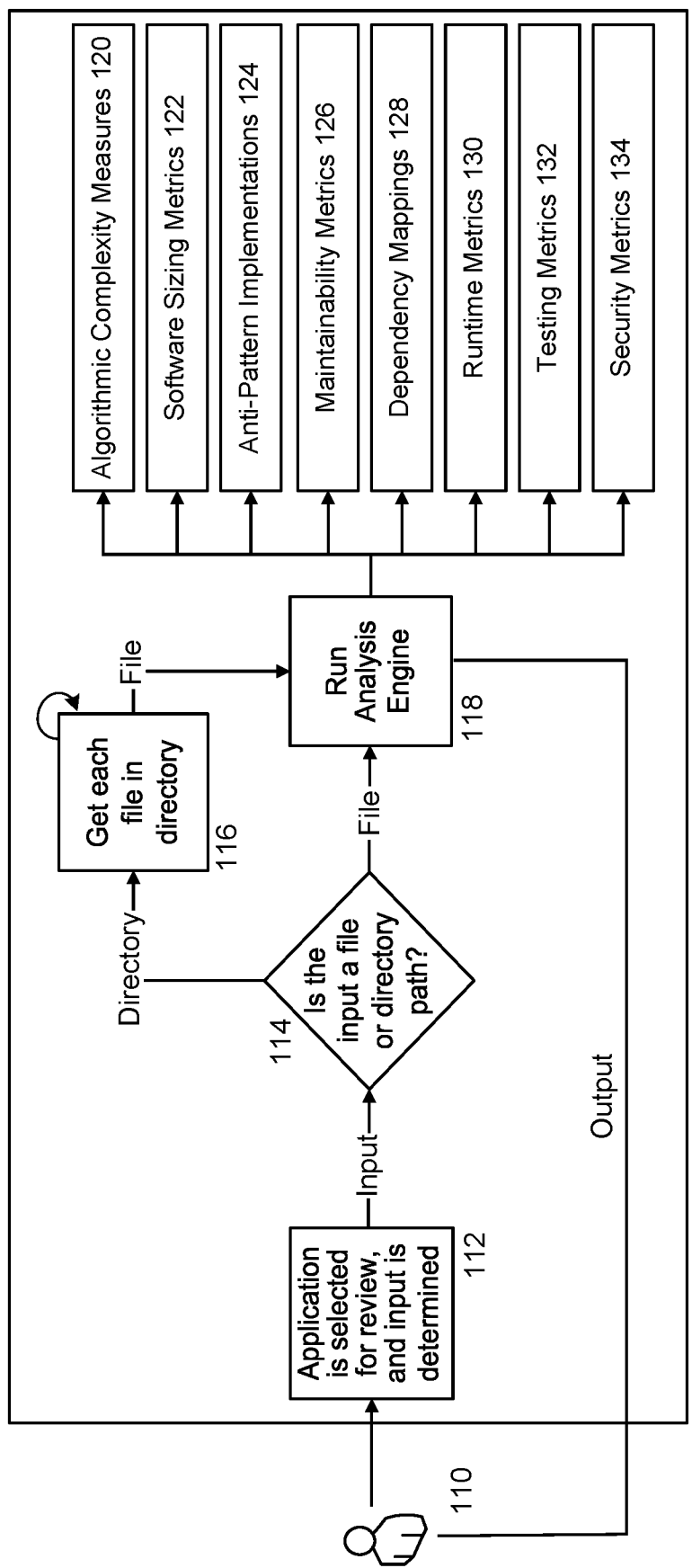
FIG. 1 is an exemplary flow diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

An embodiment of the present invention is directed to a code audit tool that intelligently analyzes and profiles code, such as Python code, based on a variety of previously unmeasured factors and metrics including anti-pattern implementations and algorithmic complexity. Once this analysis is complete, a standardized report card or other scoring interface may be generated. This report card may present findings as well as suggestions and recommended steps so that developers can make informed decisions, enhance their code bases and improve the score assigned to their code. As a result, developers no longer need to wade through endless streams of documentation, research papers, blog posts and the like. The code audit tool of an embodiment of the present invention removes ambiguity when it comes to best practices because it is compliant with a standard, such as the well-regarded SQALE industry standard for software development. Other standards, benchmarks, protocols and/or variations thereof may be applied.

The code audit tool may follow a plug-and-play model to make it extensible, user-friendly and non-intrusive. According to an embodiment of the present invention, the code audit tool may be packaged and distributed as a Python library based on a plug-and-play model. For example, the code audit tool may be implemented as a plug-in that can be integrated with a platform or environment, such as an Integrated Development Environment (IDE) plug-in. According to another example, the code audit tool may provide a command line interface for coders and developers. In yet another example, a user interface (e.g., browser-based) may be implemented. Other implementations may be realized. Developers may simply provide a path to a code file or directory. This high level of abstraction ensures that various developers, regardless of their proficiency in Python and its inner workings, may act on information uncovered by the code audit tool. Accordingly, an embodiment of the present invention provides accessibility to various users, regardless of skill and/or experience level.

According to an embodiment of the present invention, the code audit tool may be utilized during development. For example, developers may make changes to their code without putting live systems at risk. In this example, the code audit tool may not consume compute resources in actual deployment environments. The code audit tool is directed to helping developers generate and distribute high quality Python code that is efficient, optimal, secure and maintainable. Further, organizations and teams may embed quality checks in their deployment pipelines/version control systems to analyze the report card score assigned by the code audit tool. Accordingly, these tollgate checks may block unsatisfactory code from reaching higher deployment environments like Production and may allow satisfactory code to seamlessly proceed as expected.

According to an embodiment of the present invention, the code audit tool may be built organically for Python to ensure accuracy and relevance. An embodiment of the present invention may address existing gaps and holistically profile Python code through code audits. The code audit tool may provide actionable, in-depth insights to developers, regardless of their expertise level. The code audit tool may cleverly complement and add appreciable value to existing bodies of work and knowledge. With the code audit tool of an embodiment of the present invention, resulting code may be efficient, optimal, secure and maintainable, thereby realizing savings in time and resources. While the exemplary illustration is focused on Python, an embodiment of the present invention may be built around other functional programming languages as well as object oriented programming languages, such as Java, etc. For example, the metrics may be applied to other code languages with variations in syntax and language-specific features.

An embodiment of the present invention may further extend integration to external standard tooling solutions, e.g., Sonarlint, Pylint, etc. An embodiment of the present invention may also extend internal service offerings.

FIG. 1 is an exemplary flow diagram, according to an embodiment of the present invention. As seen in FIG. 1, during the development phase, an embodiment of the present invention may accept a path to a code file or directory as an input and intelligently run software checks and analysis to produce a standardized report card as an output. This tight feedback loop enables developers to improve their code quickly and efficiently.

At 110, a user may select an application for review and an input may be determined at 112. Step 114 may determine whether the input is a file or a directory path. If the input is a directory path, each file may be retrieved at step 116. Files may be received and step 118 may then run an analysis engine. The analysis engine may execute a series of processes including Algorithmic Complexity Measures 120, Software Sizing Metrics 122, Anti-Pattern Implementations 124, Maintainability Metrics 126, Dependency Mappings 128, Runtime Metrics 130, Testing Metrics 132 and Security Metrics 134. Each process may be executed on a computer processor, server and/or other processing component. The processes may operate on a central processing component or may be distributed across multiple processing components.

An output may be generated from Run Analysis Engine 118 and provided to User 110 via an interactive user interface. The output may be communicated through various other communication mechanisms. While the process of FIG. 1 illustrates certain steps performed in a particular order, it should be understood that the embodiments of the present invention may be practiced by adding one or more steps to the processes, omitting steps within the processes and/or altering the order in which one or more steps are performed.

Algorithmic Complexity Measures 120 may include: Big O/Big Theta/Big Omega Time Complexity; Big O/Big Theta/Big Omega Space Complexity; McCabe Cyclomatic Complexity; Instruction Path Length; Data Structures, etc.

Software Sizing Metrics 122 may include: Function Point Analysis (e.g., Weighted Micro Function Points); Halstead Metrics; Lines of Code, etc.

Anti-Pattern Implementations 124 may include: Python Design Pattern Violations; Python Implementation Violations, etc.

Maintainability Metrics 126 may include: Maintainability Index, Technical Debt Analysis, etc.

Dependency Mappings 128 may include: Resource Dependencies, Coupling/Cohesion Metrics (e.g., Cyclic Dependencies), etc.

Runtime Metrics 130 may include: Python Version Checks; Program Execution Time; Program Load Time, etc.

Testing Metrics 132 may include: Code Coverage; Testing Types Identification (e.g., Unit Tests, Integration Tests, Performance Tests, etc.).

Security Metrics 134 may include: Vulnerability Analysis, etc.

Figure 2:
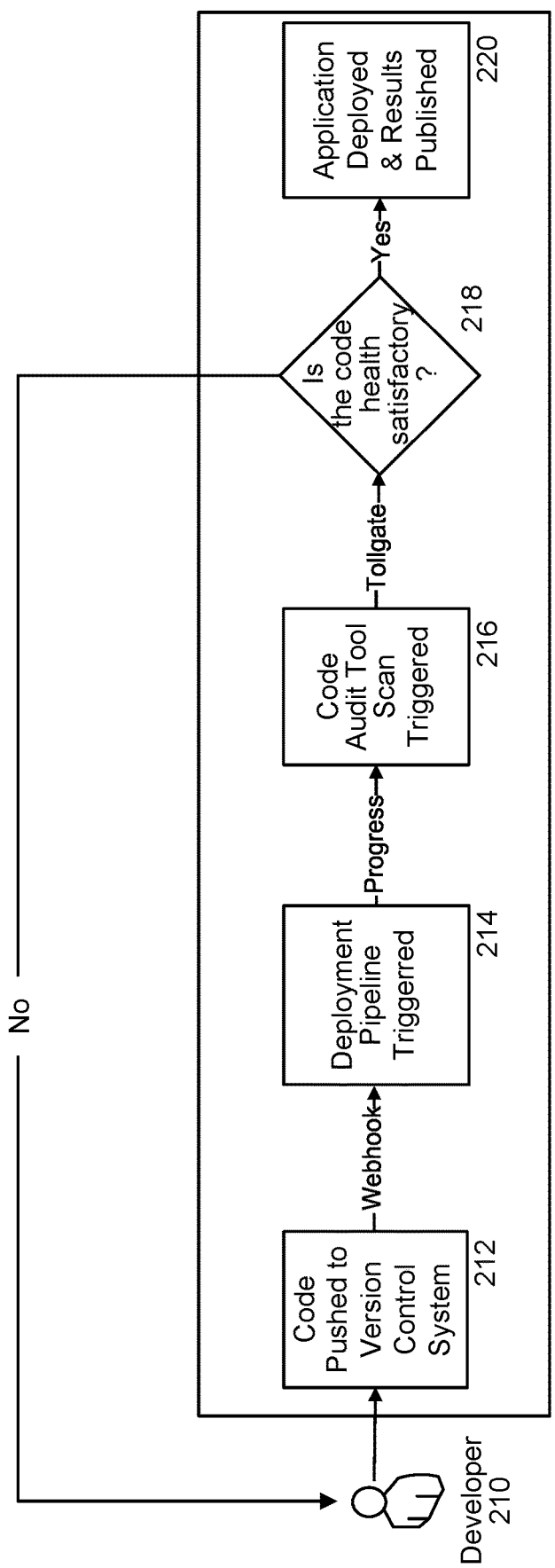
FIG. 2 is an exemplary flow diagram, according to an embodiment of the present invention.

FIG. 2 is an exemplary flow diagram, according to an embodiment of the present invention. Once the deployment procedures have been initiated, the overall code base may be subjected to a consolidated tollgate check. This may ensure that the overall application code health is acceptable before it is actually deployed to a live system. With an embodiment of the present invention, the code audit tool may be integrated with a deployment pipeline. This promotes checking the code for compliance and against various metrics prior to deployment.

As shown in FIG. 2, Developer 210 may initiate pushing code to Version Control System at step 212. A webhook may automatically pull the code into a pipeline. Development Pipeline may be triggered at step 214. Code Audit Tool scan may be triggered at step 216. Code Audit Tool scan may include multiple predetermined stages that determine various metrics. The metrics may include a combination of software dimensions, such as Algorithmic Complexities; Software Sizing Metrics; Anti-Pattern Implementations; Maintainability Metrics; Dependency Mappings; Runtime Metrics; Testing Metrics; and Security Metrics. Step 218 may determine whether the code health is satisfactory. For example, various thresholds may be applied to the metrics to determine code health. The thresholds may be dynamic and varied for metrics, applications, lines of business, etc. If the code health is below a predetermined threshold and deemed unsatisfactory, the code may be returned to Developer 210. An explanation of where and how the code failed (or otherwise deemed unsatisfactory) may be provided. In addition, suggestions and/or action items may be identified to facilitate correction and promote best practices. This may also provide an ability to interact with the developer to improve the health of the code. If the code is determined healthy, the application may be deployed and results may be published at step 220. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

Figure 3:
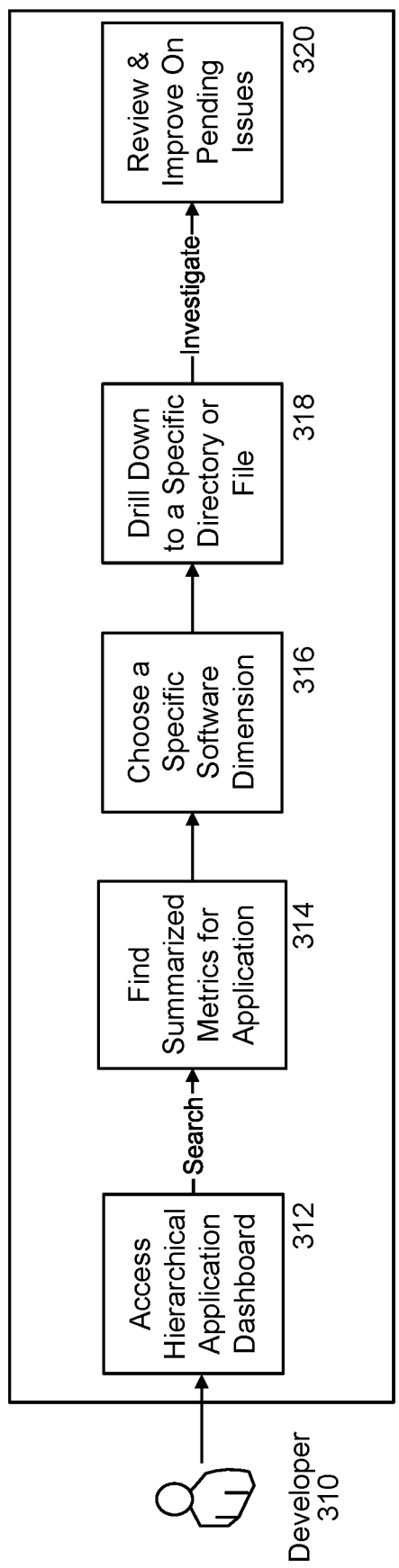
FIG. 3 is an exemplary flow diagram, according to an embodiment of the present invention.

FIG. 3 is an exemplary flow diagram, according to an embodiment of the present invention. As shown in FIG. 3, Developer 310 may access a hierarchical application dashboard at 312. A search may be initiated to find summarized metrics for an application at step 314. A user may then choose a specific software dimension at step 316. The user may drill down to a specific directory or file at step 318. The user may then perform an investigation and then review and further improve on pending issues at step 320. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
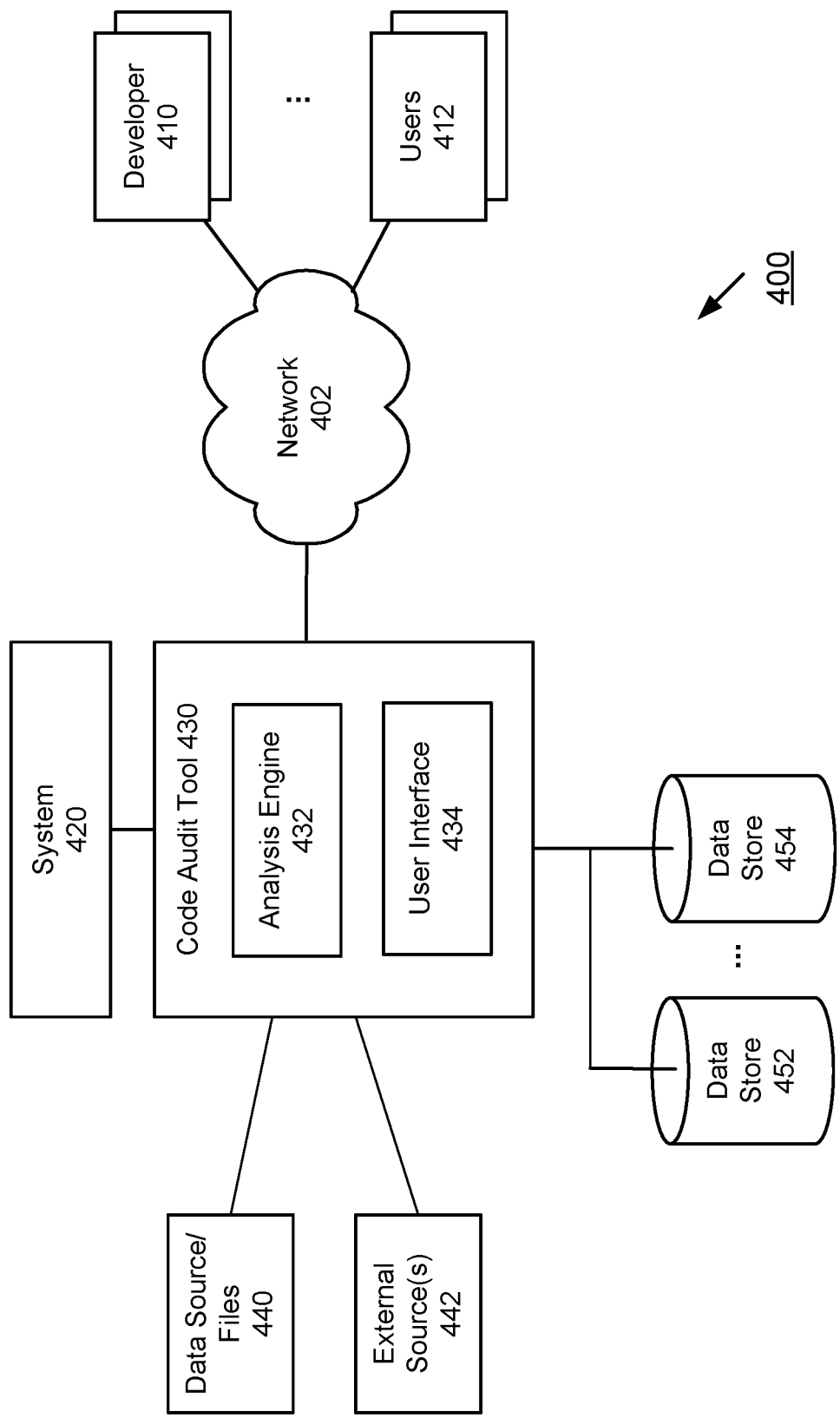
FIG. 4 illustrates a schematic diagram of a system that implementing a Code Audit Tool, according to an exemplary embodiment.

FIG. 4 illustrates a schematic diagram of a system that implementing a Code Audit Tool, according to an exemplary embodiment. As illustrated in FIG. 4, Network 402 may be communicatively coupled to computing devices associated with Developers 410 and/or other users, represented by Users 412. Computing devices may include computers, laptops, workstations, kiosks, terminals, tablets, mobile devices, mobile phones, smart devices, etc. Network 402 communicates with Code Audit Tool 430 that performs code analysis in accordance with various embodiments of the present invention. Code Audit Tool 430 may be integrated or in communication with System 420. System 420 may represent an entity, provider as well as various systems and environments, such as Integrated Development Environments (IDE) and Version Control Systems (VCS). Code Audit Tool 430 may be integrated as a plug-in, through an API and/or other software component.

Code Audit Tool 430 may also incorporate modules and other functions, such as Analysis Engine 432 and User Interface (UI) 434. Analysis Engine 432 may represent a computer processor, server and/or other processing components and/or modules. User Interface 434 may represent interactive interfaces including command line interfaces, browser-based interfaces, etc. User Interface 434 may provide a standardized output, score and/or other summary of the analyzed code. These modules are exemplary and illustrative, Code Audit Tool 430 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Code Audit Tool 430 may receive and/or extract data from various data sources or files represented by Data Source/Files 440. In addition, external data relating to standards and/or other industry data may be received and/or extracted from various sources represented by External Source(s) 442. In addition, Code Audit Tool 430 may be communicatively coupled to data storage devices represented by Data stores 452, 454. Data stores 452, 454 may also store and maintain source code, reports, performance data, etc.

The system 400 of FIG. 4 may be implemented in a variety of ways. Architecture within system 400 may be implemented as hardware components (e.g., module) within one or more network elements. It should also be appreciated that architecture within system 400 may be implemented in computer executable software (e.g., on a tangible, non-transitory computer-readable medium) located within one or more network elements. Module functionality of architecture within system 400 may be located on a single device or distributed across a plurality of devices including one or more centralized servers and one or more mobile units or end user devices. The architecture depicted in system 400 is meant to be exemplary and non-limiting. For example, while connections and relationships between the elements of system 400 is depicted, it should be appreciated that other connections and relationships are possible. The system 400 described below may be used to implement the various methods herein, by way of example. Various elements of the system 400 may be referenced in explaining the exemplary methods described herein.

Network 402 may be a wireless network, a wired network or any combination of wireless network and wired network. For example, Network 402 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 402 may support an Internet network, a wireless communication network, a cellular network, Bluetooth, or the like, or any combination thereof. Network 402 may further include one, or any number of the exemplary types of networks mentioned above operating as a stand-alone network or in cooperation with each other. Network 402 may utilize one or more protocols of one or more network elements to which it is communicatively coupled. Network 402 may translate to or from other protocols to one or more protocols of network devices. Although Network 402 is depicted as one network for simplicity, it should be appreciated that according to one or more embodiments, Network 402 may comprise a plurality of interconnected networks, such as, for example, a service provider network, the Internet, a cellular network, corporate networks, or even home networks, or any of the types of networks mentioned above.

Data may be transmitted and received via Network 402 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

Code Audit Tool 430 may be communicatively coupled to Data Stores 452, 454 as well as remote storages. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 402, or communications may involve a direct connection between the various storage components and Code Audit Tool 430, as depicted in FIG. 4. The storage components may also represent cloud or other network based storage.

The various embodiments of the present invention may apply to a wide range of applications, use cases and scenarios.

Figure 5:
FIG. 5 is an exemplary user interface, according to an embodiment of the present invention.

FIG. 5 is an exemplary user interface, according to an embodiment of the present invention. To start off, the user may navigate to an interface, e.g., website, via a browser. The user may then search for an application using a search feature, e.g., pre-populated search bar. In the background, an embodiment of the present invention may perform checks to ensure that, by default, users can only view the data associated with their application(s). This behavior may be modified if a user applies for and is granted elevated permissions (e.g., senior management, application developers, application owners, product owners, authorized users, etc.). Once the application has been selected, a summary page may get automatically populated based on the latest code audit scan results from a deployment pipeline. Users may drill down into specific software dimensions by clicking on them to view more granular information.

As shown by FIG. 5, an overall result may be identified at 502. This may include failed or passed or other status identifier. The overall result may be based on a calculation or determination based on the aggregated metrics. In the example of FIG. 5, the user interface may include status information relating to a set of metrics, such as Algorithmic Complexity 510, Software Sizing Metrics 512, Anti-Pattern Implementation 514, Maintainability Metrics 516, Dependency Mappings 518, Runtime Metrics 520, Testing Metrics 522, and Security Metrics 524. Additional details that form the basis of the status may be provided for each metric.

Figure 6:
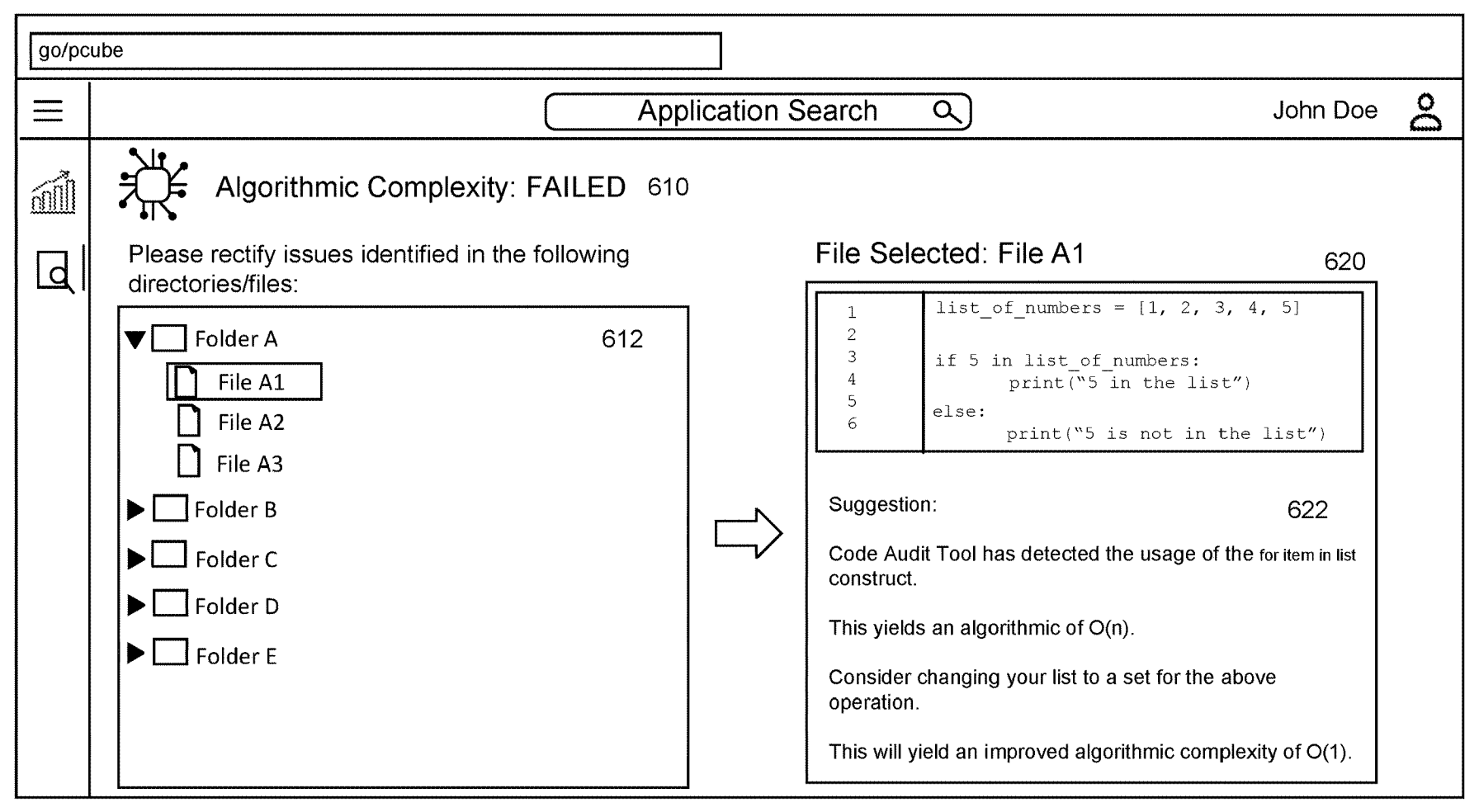

FIG. 6 is an exemplary user interface, according to an embodiment of the present invention. Upon selection of one of the eight software dimensions, an interface illustrated by FIG. 6 may be presented to the user. As shown in FIG. 6, the user may view directories and/or files that do not comply with the standards for a particular software dimension. The user may select a file and instantly view improvement recommendations, thereby enabling a developer to resolve pending issues quickly. By acting on the insights for each dimension, the overall code quality may be improved. With the code audit tool, developers may become familiar with best practices that are espoused by an embodiment of the present invention so that an entity may develop and deploy/distribute higher quality code right from the start.

As shown in FIG. 6, Algorithmic Complexity status may be provided at 610. A file may be selected at 612. In this example, File A1 is selected. The selected file may be shown in detail at 620. Suggestions may be generated and provided at 622. For example, suggestions may provide steps or recommendations to resolve an issue. Other information may be provided, including graphics, links to other data, animations, tutorials, etc.

According to an embodiment of the present invention, a set of software dimensions may include: Algorithmic Complexities; Software Sizing Metrics; Anti-Pattern Implementations; Maintainability Metrics; Dependency Mappings; Runtime Metrics; Testing Metrics; and Security Metrics. Various combinations of software dimensions may be implemented. In addition, other dimensions, metrics and considerations may be added. Collectively, these dimensions, in various combinations, may provide accurate and granular code insights.

Additional details for software dimensions are provided below.

Algorithmic Complexities may be used to determine the amount of compute resources required to execute a particular block of code. More specifically, time complexity explains the time taken while space complexity explains the memory used whilst executing an algorithm. These measures may be scored using the Big-O/Big-Theta/Big-Omega notations which respectively explain the worst, average and best case scenarios for an algorithm's run time/memory usage. In general, as the size of a problem increases, so does its run time and memory usage.

An exemplary embodiment may relate to how Big-O notation varies across algorithms. In Python, the algorithmic complexity for operations for predefined data structures has been well-documented. This allows the code audit tool of an embodiment of the present invention to accurately assess different blocks of code.

FIG. 7 is an example of operational complexities associated with Matrix Multiplication in Python, according to an embodiment of the present invention.

In addition to time/space complexity, other complexities may include McCabe cyclocmatic complexity which measures the number of linearly independent paths through a programs source code and instruction path length which measures the number of machine code instructions executed for a block of code.

FIG. 8 an example of software sizing metrics, according to an embodiment of the present invention. Software Sizing Metrics may represent the size of a software application. This metric may be determined/estimated by statically computing certain code metrics. An embodiment of the present invention may focus on Halstead metrics which identifies the number of distinct operators and operands, total number of operators and operands, program length, volume and difficulty, as well as Raw metrics which identifies the number of Source Lines of Code (SLOC), Logical Lines of Code (LLOC) and Blank Lines (BL).

In addition, an embodiment of the present invention may consider Function Point Analysis using Weighted Micro Function Points to add value to software sizing analysis.

FIG. 9 illustrates an example relating to readability/maintainability Anti-Pattern, according to an embodiment of the present invention. Anti-Pattern Implementations may represent violations in coding syntax/logic that go against recommended conventions for code implementations/design patterns. These violations adversely impact the hygiene, performance, and security of the source code. As such, they should be remedied as soon as possible. The code audit tool is directed to intelligently detecting such occurrences.

Maintainability Metrics may represent code that is easy to understand. As discussed above, anti-pattern detection is one way to ensure maintainability (e.g., to ensure that it is easy to understand, support and change the code). An embodiment of the present invention recognizes that there are additional evaluations of maintainability that rely on a confluence of factors. The code audit tool may specifically focus on Maintainability Index, which is a calculated using SLOC, Complexity and Halstead Volume as inputs. The code audit tool may also estimate technical debt by considering runtime metrics, such as the Python version being used.

Dependency Mappings recognize that a block of code will be dependent on computer resources (e.g., CPU, RAM, Disk Space, etc.) and on coding resources (e.g., libraries, frameworks, modules, etc.). The code audit tool may analyze these dependencies and identify various issues, such as over usage, tight coupling and cyclic dependencies.

FIG. 10 an example of runtime metrics that may be displayed at a module-level, according to an embodiment of the present invention. Runtime Metrics provide insights into the behavior and performance of a particular block of code. The code audit tool may analyze the Python version at runtime to ensure that it is the latest stable version, the program load time to see if resource invocation is optimal and the program execution time to assess performance.

FIG. 11 is an exemplary illustration of testing metrics, according to an embodiment of the present invention. Testing Metrics recognize that good code base has automated tests that accompany it. These tests are there to ensure that different blocks of code are behaving as expected. Furthermore, these test cases may have specialized use cases (e.g., unit tests, integration tests, performance tests, UI tests, etc.). The code audit tool may identify the test type and analyze corresponding metrics like code coverage (if any).

FIG. 12 is an example using hardcoded passwords, according to an embodiment of the present invention. Security Metrics represent a crucial dimension in enterprise software. The code audit tool may be directed to identifying common vulnerabilities/insecure code instances and flag them with suggestions.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include object oriented language and functional programming language, such as C, C++, Java, JavaScript, Python, etc. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a code audit tool, the system comprising:
    an interactive user interface that interacts with one or more users through a communication network;
    a memory component that stores an industry standard for software development; and
    a computer processor, coupled to the interactive user interface and the memory component and is programmed to perform:
    identifying a directory including a plurality of files corresponding to an application to be analyzed, each of the plurality of files including a set of code;
    retrieving, for each of the plurality of files, the set of code;
    for each of the plurality of files included in the directory, sequentially analyzing the set of code by invoking an optimal series of processes comprising each of:
        an Algorithmic Complexities process;
        a Software Sizing Metrics process;
        an Anti-Pattern Implementations process;
        a Maintainability Metrics process;
        a Dependency Mappings process;
        a Runtime Metrics process;
        a Testing Metrics process; and
        a Security Metrics process;
    generating a code health determination based on each of the optimal series of processes prior to deployment of the set of code;

generating and displaying, via the interactive user interface:
  an overall result for the code health determination indicating a success or failure based on a failure or success result for each of the optimal series of processes; and
  a plurality of virtual buttons arranged in rows and columns for each of the optimal series of processes on a single display screen, wherein each of the plurality of virtual buttons include:
    a result for each of the optimal series of processes, wherein the result indicates a pass or a fail,
    a first graphical icon representing a corresponding process among the optimal series of processes, and
    a second graphical icon graphically indicating the result for the corresponding process among the optimal series of processes, wherein the second graphical icon displays a first image for the pass result and a second image different from the first image for the fail result,
  wherein each of the plurality of virtual buttons includes the result interposed between the first graphical icon and the second graphical icon;
receiving a selection, among failed optimal series of processes, of one of the failed optimal series of processes;
retrieving and listing, one or more files corresponding to the selected one of the failed optimal series of processes;
for the selected one of the failed optimal series of processes, displaying one or more code suggestions and recommended changes for the selected failed optimal series of processes, wherein the one or more code suggestions and recommended changes to be implemented prior to deployment;
receiving at least one input that both corresponds to the selection of the one of the failed optimal series of processes of the set of code and that is responsive to the one or more code suggestions and recommended changes to improve the code health determination;
receiving an expected improvement value for the one or more code suggestions prior to implementation thereof,
wherein, when the selected one of the failed optimal series of processes is the Algorithmic Complexities process, a complexity that measures (i) a number of linearly independent paths through a program source code and (ii) an instruction path length indicating a number of machine code instructions executed for a block of code, is displayed,
wherein, when the selected one of the failed optimal series of processes is the Software Sizing Metrics process, identifying both Halstead metrics and raw metrics,
wherein the Halstead metrics including each of a number of distinct operators, a number of distinct operands, a program length, a volume and a difficulty, and
wherein the raw metrics include a number of source lines of code, a number of total lines of code, a number of logical lines of code, and a number of blanks; and
receiving a selection of a target file among the one or more files,
wherein, in response to the receiving the selection of the target file among the one or more files corresponding to the selected one of the failed optimal series of processes,
  the user interface further displays, on the single display screen:
    a result status of the one of the failed optimal series of processes;
    a listing of at least one directory with at least one corresponding file including issues with the one of the failed optimal series of processes; and
  in response to a selection of the at least one corresponding file included in the listing, a window including affected lines of code in the selected file, along with corresponding one or more code suggestions and expected improvement values based on the implementation of the one or more code suggestions.

2. The system of claim 1, wherein the Algorithmic Complexities process determines an amount of compute resources required to execute at least a portion of the set of code.

3. The system of claim 1, wherein the Anti-Pattern Implementations process identifies one or more violations in recommended coding conventions.

4. The system of claim 1, wherein the Maintainability Metrics process estimates technical debt based on one or more runtime metrics.

5. The system of claim 1, wherein the Dependency Mappings process analyzes dependencies on computer resources and coding resources.

6. The system of claim 1, wherein the Runtime Metrics process indicates behavior and performance of at least a portion of the set of code.

7. The system of claim 1, wherein the Testing Metrics process executes a set of automated tests that ensure at least a portion of the set of code behaves as expected.

8. The system of claim 1, wherein the Security Metrics process identifies vulnerabilities and insecure code instances in at least a portion of the set of code.

9. A method that implements a code audit tool, the method comprising:
  identifying a directory including a plurality of files corresponding to an application to be analyzed, each of the plurality of files including a set of code;
  retrieving, for each of the plurality of files, the set of code;
  for each of the plurality of files included in the directory, sequentially analyzing, via an analysis engine comprising a computer processor, the set of code by invoking an optimal series of processes comprising each of:
    an Algorithmic Complexities process;
    a Software Sizing Metrics process;
    an Anti-Pattern Implementations process; a Maintainability Metrics process;
    a Dependency Mappings process;
    a Runtime Metrics process;
    a Testing Metrics process; and
    a Security Metrics process;
  generating a code health determination based on each of the optimal series of processes prior to deployment of the set of code;
  generating and displaying, via an interactive user interface:
    an overall result for the code health determination indicating a success or failure based on a failure or success result for each of the optimal series of processes; and
    a plurality of virtual buttons arranged in rows and columns for each of the optimal series of processes on a single display screen, wherein each of the plurality of virtual buttons include:
      a result for each of the optimal series of processes, wherein the result indicates a pass or a fail, a first graphical icon representing a corresponding process among the optimal series of processes, and a second graphical icon graphically indicating the result for the corresponding process among the optimal series of processes, wherein the second graphical icon displays a first image for the pass result and a second image different from the first image for the fail result, wherein each of the plurality of virtual buttons includes the result interposed between the first graphical icon and the second graphical icon;

receiving a selection, among failed optimal series of processes, of one of the failed optimal series of processes;

retrieving and listing, one or more files corresponding to the selected one of the failed optimal series of processes;

for the selected one of the failed optimal series of processes, displaying one or more code suggestions and recommended changes for the selected failed optimal series of processes, wherein the one or more code suggestions and recommended changes to be implemented prior to deployment;

receiving at least one input that both corresponds to the selection of the one of the failed optimal series of processes of the set of code and that is responsive to the one or more code suggestions and recommended changes to improve the code health determination;

receiving an expected improvement value for the one or more code suggestions prior to implementation thereof, wherein, when the selected one of the failed optimal series of processes is the Algorithmic Complexities process, a complexity that measures (i) a number of linearly independent paths through a program source code and (ii) an instruction path length indicating a number of machine code instructions executed for a block of code, is displayed, wherein, when the selected one of the failed optimal series of processes is the Software Sizing Metrics process, identifying both Halstead metrics and raw metrics, wherein the Halstead metrics including each of a number of distinct operators, a number of distinct operands, a program length, a volume and a difficulty, and wherein the raw metrics include a number of source lines of code, a number of total lines of code, a number of logical lines of code, and a number of blanks; and receiving a selection of a target file among the one or more files, wherein, in response to the receiving the selection of the target file among the one or more files corresponding to the selected one of the failed optimal series of processes, the user interface further displays, on the single display screen:

a result status of the one of the failed optimal series of processes;

a listing of at least one directory with at least one corresponding file including issues with the one of the failed optimal series of processes; and in response to a selection of the at least one corresponding file included in the listing, a window including affected lines of code in the selected file, along with corresponding one or more code suggestions and expected improvement values based on the implementation of the one or more code suggestions.

10. The method of claim 9, wherein the Algorithmic Complexities process determines an amount of compute resources required to execute at least a portion of the set of code.

11. The method of claim 9, wherein the Anti-Pattern Implementations process identifies one or more violations in recommended coding conventions.

12. The method of claim 9, wherein the Maintainability Metrics process estimates technical debt based on one or more runtime metrics.

13. The method of claim 9, wherein the Dependency Mappings process analyzes dependencies on computer resources and coding resources.

14. The method of claim 9, wherein the Runtime Metrics process indicates behavior and performance of at least a portion of the set of code.

15. The method of claim 9, wherein the Testing Metrics process executes a set of automated tests that ensure at least a portion of the set of code behaves as expected.

16. The method of claim 9, wherein the Security Metrics process identifies vulnerabilities and insecure code instances in at least a portion of the set of code.

* * * * *